July 30, 1946.    H. J. CARLIN    2,404,945
ELECTRICAL RELAY
Filed March 18, 1944
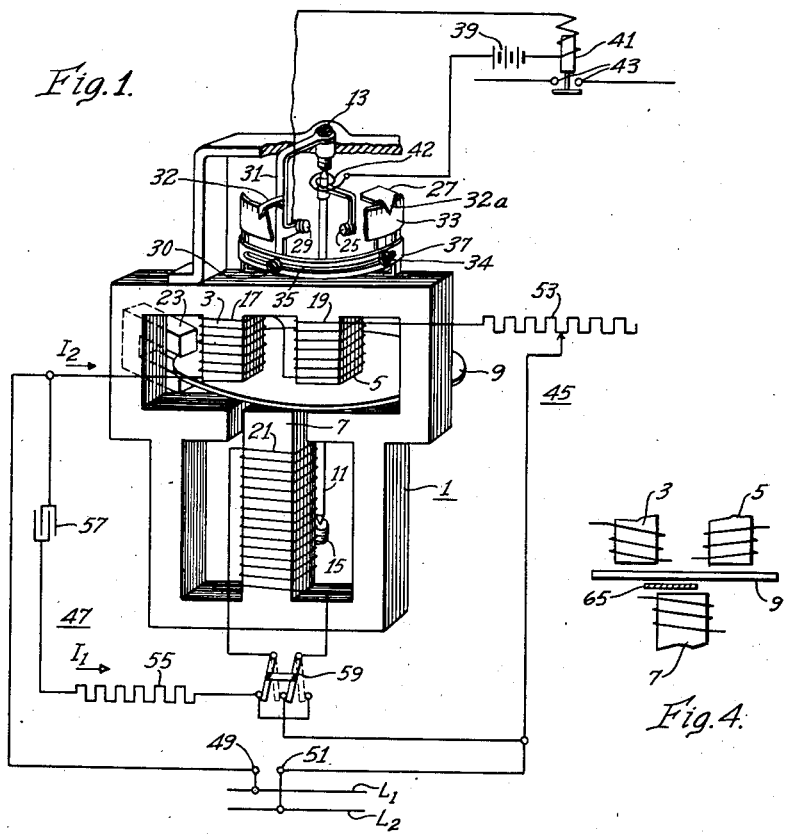
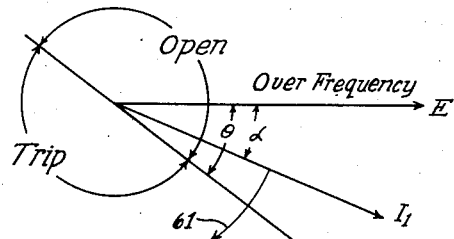
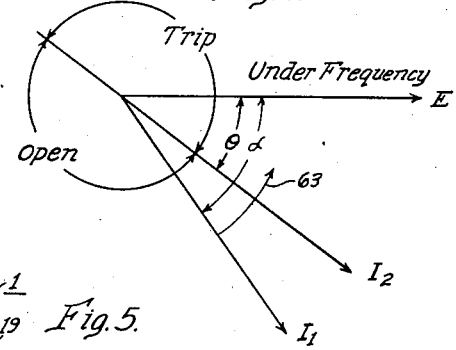
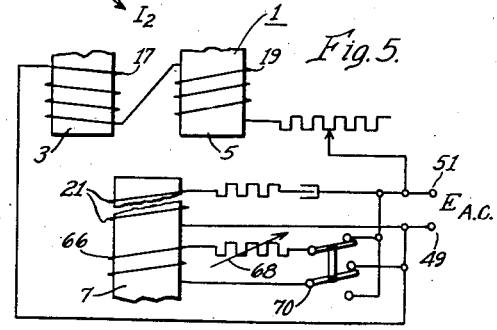
WITNESSES:
C. J. Weller.
Thur. C. Groove
INVENTOR
Herbert J. Carlin.
BY C. L. Freedman
ATTORNEY Patented July 30, 1946

2,404,945

UNITED STATES PATENT OFFICE 2,404,945

ELECTRICAL RELAY

Herbert J. Carlin, East Orange, N. J., assignor to Westinghouse Electric Corporation, East Pittsburgh, Pa., a corporation of Pennsylvania Application March 18, 1944, Serial No. 527,059

12 Claims. (Cl. 175—320)

This invention relates to an electrical device responsive to the phase relationship between two alternating quantities and it has particular relation to such an electrical device wherein the aforesaid phase relationship is dependent on a variable quantity, such as the frequency of a source of alternating electrical energy.

The frequency-responsive devices, such as electrical relays, employed in the past have utilized two electromagnets associated with a common armature structure. Frequency relays of this type are disclosed, for example, in the "Relay Handbook," published in 1926 by the National Electric Light Association of New York city. The construction and servicing of these prior art frequency relays is complicated because of the requirement of two electromagnets therefor. Furthermore, such relays are difficult to compensate for errors introduced by variations in the applied voltage and by variations in ambient temperature.

In accordance with the invention, an electrical device, such as a frequency relay, is responsive to the phase relationship between two alternating quantities. The device includes a directional element which is directionally responsive to the deviation of the phase relationship of the two alternating quantities from a predetermined value. In a specific embodiment of the invention, an induction type directional element is provided wherein two windings, when energized by currents differing in phase relative to each other, produce a shifting magnetic field in an air gap. An electroconductive armature is positioned in the air gap for rotation in response to the shifting magnetic field and may be employed for operating an electrical switch or for any other desired purpose. The windings of the induction type directional element are connected respectively in two parallel arms of an electrical circuit which is energized in accordance with the voltage of a source of alternating electrical energy. The impedances of the arms include reactive components designed to provide a phase relationship between currents flowing in the two arms which varies as a function of the frequency of the voltage applied to the electrical circuit. The range of variation is such that the currents in the two parallel arms are in phase at a predetermined frequency value. When the frequency passes through the aforesaid predetermined value, a reversal occurs in the direction of the torque applied to the armature of the directional element. This reversal in torque may be employed to actuate a switch associated with the armature.

By inserting a suitable adjustable impedance in either or both of the parallel arms of the electrical circuit, the value of frequency at which the currents in the two arms are in phase readily may be adjusted. Such adjustments have substantially no effect on the timing characteristics of the device, and the time delay of the device may be adjusted conveniently by adjustment of the distance between the fixed and movable contacts of the switch actuated by the armature element. By correct construction of the impedances in the two parallel arms, errors introduced by variations in applied voltage and in ambient temperature may be held to extremely small values.

It is, therefore, an object of the invention to provide an improved electrical device which is responsive to the phase relationship between a plurality of alternating quantities.

It is a further object of the invention to provide an electrical device responsive to the phase relationship between a plurality of alternating quantities wherein such phase relationship is controlled by a single variable quantity.

It is an additional object of the invention to provide a frequency relay which is responsive to the phase displacement between currents in parallel arms of an electrical circuit and wherein the parallel arms have values of impedance which are dependent on the frequency of an applied alternating quantity for the purpose of controlling the phase displacement between the aforesaid currents.

Other objects of the invention will be apparent from the following description, taken in conjunction with the accompanying drawing, in which:

Figure 1 is a schematic view, with parts in perspective and parts broken away, of an electrical system embodying a relay designed in accordance with the invention;

Figs. 2 and 3 are vector diagrams showing voltage and current relationships in the system of Fig. 1; and Figs. 4 and 5 are schematic views with parts in elevation, and with parts broken away, showing a modification of the relay of Fig. 1.

Referring to the drawing, Figure 1 shows an electrical device which is responsive to the phase relationship between a plurality of alternating currents. This device includes a directional element which is illustrated as of the induction type. A suitable directional element may include a magnetic structure 1 having a pair of pole pieces 3 and 5 and a third pole piece 7 which is spaced from the aforesaid pair to define an air gap. An electroconductive armature 9 is positioned in the air gap and mounted on a shaft 11 for rotation in suitable bearings 13 and 15. Conveniently, the armature 9 may be formed of an electroconductive material such as copper or aluminum.

Windings 17 and 19 are positioned on the pole pieces 3 and 5. In addition, a winding 21 is positioned on the pole piece 7. As well understood in the art, when the windings 17 and 19, on the one hand, and the winding 21, on the other hand, are energized by alternating currents which are displaced in phase from each other, magnetic fluxes are produced displaced in time phase, and thus effectively a shifting magnetic field is produced in the air gap between the pole pieces. This shifting magnetic field is effective for rotating the armature 9. The direction of rotation of the armature depends on the direction of phase displacement of the current flowing through the windings 17 and 19 from the current flowing through the winding 21. Rotation of the armature 9 may be damped in a conventional manner by means of a permanent magnet 23 which is positioned to direct magnetic flux through the armature.

Rotation of the armature 9 may be employed in any desirable manner. For the purpose of illustration, the shaft 11 carries a contact 25 which is movable between a stop 27 and a contact 29 in response to rotation of the shaft 11. The contact 29 or the stop 27, or both of these elements may be adjustable about the axis of the shaft 11. To permit such adjustment, the contact 29 is mounted on a lever 31 which is rotatable about the axis of the shaft 11. The arm 31 may be secured in any position of adjustment by means of a clamping screw 36 which passes through a slot 35 in a cylindrical guide strip 37. Adjustment of the stop 27 may be effected in a similar manner by providing a clamping screw 34 therefor. The lever 31 and the stop 27 may carry pointers 32 and 32a which overlie a scale 33 suitably calibrated to indicate the position or adjustment of the contact 29 or the stop 27. In most cases adjustment of the stop 27 alone suffices for adjusting the relay timing.

Relative movement of the contact 25 and 29 may be employed for any suitable control function. In the specific embodiment of Fig. 1, engagement of the contact 25 with the contact 29 completes a circuit connecting a source of electrical energy, such as a battery 39 to a solenoid operated contactor 41. The contact 25 may be suitably insulated from the shaft 11 and may be connected to the battery 39 through a flexible, conductive spiral spring 42 which surrounds the shaft 11. Energization of the contactor 41 closes a pair of contacts 43 which may be the tripping contacts of an associated circuit breaker (not shown).

In order to energize the windings associated with the magnetic structure 1, the windings are connected in the two arms 45 and 47 of an electrical circuit having two terminals 49 and 51. The windings 17 and 19, together with a resistor 53, are connected in series in the arm 45. The winding 21, together with a resistor 55 and a capacitor 57, are connected in series in the arm 47. The arms 47 and 45 provide paths respectively for the currents $I_1$ and $I_2$. The terminals 49 and 51 may be connected for energization of the electrical circuit in accordance with the voltage across the conductors $L_1$ and $L_2$ of a source of alternating electrical energy. Instantaneous directions of flow for the currents $I_1$ and $I_2$ are indicated by the arrows in Fig. 1.

To provide a manual control for the direction of rotation of the armature 9 when the windings associated therewith are suitably energized, a reversing switch 59 is provided for connecting the winding 21 into the arm 47 of the associated electrical circuit. If it is desired to change the direction of the rotation of the armature 9 at any time, the switch 59 may be actuated from the position illustrated in full lines in Fig. 1 to the position illustrated in dotted lines.

The operation of the system illustrated in Fig. 1 can be explained best by reference to the vector representations of Figs. 2 and 3. Let it be assumed first that the electrical device of Fig. 1 is an overfrequency relay which is intended to close its contacts 25 and 29 when the frequency of the alternating voltage E applied thereto exceeds a predetermined value. The voltage E and the currents $I_1$ and $I_2$ which flow through the arms 47 and 45 in response to the voltage E are illustrated in Fig. 2. When the frequency of the voltage E is at its normal value, which is below the aforesaid predetermined value at which the relay is intended to trip, the impedances of the arms 45 and 47 may be designed to produce lagging currents similar to those represented in Fig. 2. For example, the current $I_1$ may lag the voltage E by an angle $\alpha$, whereas the current $I_2$ lags the voltage E by an angle $\theta$. Inasmuch as the currents $I_1$ and $I_2$ are displaced from each other by the angle $(\theta - \alpha)$ a shifting magnetic field is produced in the air gap of the relay and a torque is applied to the armature 9. For the conditions thus far assumed, the reversing switch 59 is so connected that the movable contact 25 is urged by the aforesaid torque against the stop 27.

As the frequency of the voltage E increases, the reactance of the capacitor 57 decreases. The reactance of the winding 21 increases and the current $I_1$ becomes more lagging with respect to the voltage. The direction of movement of the vector $I_1$ in Fig. 2 as the frequency increases is represented by an arrow 61. The vector $I_2$ will also tend to lag slightly, but its movement is negligible with respect to $I_1$, and hence may be assumed fixed in position. By inspection of Fig. 2, it will be observed that as the vector $I_1$ moves in the direction of the arrow 61 in response to an increase in the frequency of the voltage E, it reaches a position wherein the currents $I_1$ and $I_2$ are in phase. This is assumed to occur when the frequency of the voltage E is at a predetermined value above which the movable contact 25 is to engage the contact 29 of the relay. When the currents $I_1$ and $I_2$ are in phase, no torque is applied to the armature 9. However, if the frequency of the voltage E continues to increase above the aforesaid predetermined value, the value of the angle $\alpha$ exceeds that of the angle $\theta$ and a torque again is applied to the armature 9. It should be noted that since the current $I_1$ has moved from a position wherein it leads the current $I_2$ to a position wherein it lags the current $I_2$, the direction of the torque applied to the armature 9 reverses and the movable contact 25 is urged from the stop 27 into engagement with the fixed contact 29. The time required for the movable contact to engage the fixed contact depends on the angular distance about the shaft 11 between the fixed contact 29 and the stop 27 against which the movable contact normally rests, the strength of the permanent magnet 23 and the value of the torque applied by the magnetic structure 1 and associated windings to the armature 9. For any setting of the stop 27 relative to the fixed contact 29, the relay has an inverse time delay with respect to the excess in frequency above the predetermined value at which the relay is to operate. In the case of the overfrequency relay, the greater the difference between the actual frequency of the voltage E and the predetermined frequency above which the relay is to operate, the faster the relay closes its contacts.

From the foregoing discussion, it will be appreciated that as long as the current $I_1$ lies within the angular range marked "open" in Fig. 2, the movable contact 25 is urged against its stop 27. When the current $I_1$ lies within the angular range marked "trip" in Fig. 2, the movable contact 25 is urged toward the fixed contact 29.

Operation of the relay occurs when the current $I_1$ is adjacent to the current $I_2$. As long as the values of inductance, capacitance and resistance of the two arms 45 and 47 are independent of voltage, the operating point of the relay also is substantially independent of voltage since it only depends on the phase angle between currents, and not on their magnitudes. Because the magnetic structure 1 has a magnetic permeability which may vary in accordance with the density of magnetic flux therein, the inductances of the windings may change somewhat in response to changes in applied voltage. However, such changes may be minimized by operating the iron well below saturation, and any small changes which may occur tend to swing both currents $I_1$ and $I_2$ in the same direction with respect to the voltage E (Fig. 2) and consequently do not change appreciably the operating point of the relay. For example, in a relay actually constructed, it was found that a 10% change in voltage resulted in a change in the frequency at which the relay operated of only 1% of the frequency range. That is, a 60-70 cycles per second relay indicated an error of only $.01 \times 10 = .1$ cycle per second. This small voltage error may be substantially eliminated in a manner pointed out below, but in most applications an error of this magnitude is not objectionable.

Let it be assumed next that the relay is to close its contacts when the frequency drops below a predetermined value. When the frequency of the voltage is below the predetermined value, the vector relationships may be similar to those illustrated in Fig. 3. It will be noted that the current $I_2$ now leads the current $I_1$. The reversing switch 59 is so positioned that a torque applied to the armature 9 when the vectors of the currents $I_1$ and $I_2$ occupy the positions illustrated in Fig. 3 urges the movable contact 25 against the stop 27. As the frequency drops, the reactance of the capacitor 57 increases and the current $I_1$ becomes less lagging. At the predetermined value of frequency above which the relay is to operate, the current $I_1$ is substantially in phase with the current $I_2$. The direction of rotation of the current $I_1$ as the frequency drops is represented in Fig. 3 by an arrow 63.

If the frequency drops below the aforesaid predetermined value, the current $I_1$ leads the current $I_2$ and the direction of the torque applied to the armature 9 reverses to urge the movable contact 25 into engagement with the contact 29. The relay operates with a time delay similar to that discussed for overfrequency operation.

The effect of variations in ambient temperature now may be considered. In response to a change in temperature, the inductances of the windings 17, 19 and 21 may change slightly. However, such changes tend to rotate the vectors $I_1$ and $I_2$ of Figs. 2 and 3 in the same direction with respect to the voltage E. Consequently, such changes in inductance are to a substantial extent self-compensating. Resistors having substantially a zero temperature coefficient of resistance and capacitors having substantially a zero temperature coefficient of capacitance are available. Consequently, by selecting suitable resistors and capacitors, the relay illustrated in Fig. 1 may be made substantially free of errors introduced by ambient temperature.

In an electrical relay embodying the invention which was constructed and tested, it was found that a capacitor having a zero temperature coefficient of capacitance in association with suitably selected resistors provided a frequency relay wherein the tripping frequency varied only slightly with variations in relay temperature. Even better performance was obtained by employing a capacitor having a temperature variation of capacitance of $-.04\%$ per degree centigrade, to compensate for the variation in resistance of the copper used to wind coils 17, 19, 21. Capacitors having a negative temperature variation of this magnitude are readily available on the market. In the relay employing a capacitor having a negative temperature variation of capacitance and adjusted to trip at a frequency of 55 cycles per second, it was found that the tripping frequency varied less than plus or minus $\frac{1}{10}$ of a cycle per second over a temperature range of $-20$ to $65°$ C.

In order to vary the frequency at which the relay trips, one of the resistors 53 or 55 may be adjustable. In Fig. 1, the resistor 53 is indicated as being adjustable for this purpose. Referring to Fig. 2, it will be observed that the effect of an increase in the resistance value of the resistor 53 is to decrease the value of the angle $\theta$. This decreases the value of the frequency at which the currents $I_1$ and $I_2$ are in phase. Consequently, by adjustment of the resistor 53, the tripping frequency of the relay may be adjusted over a suitable range, such as 10 cycles per second. For example, a relay was constructed to operate at any frequency within a range between 50 and 60 cycles per second. Adjustment of the relay within this range has little effect on other characteristics of the relay. Errors due to voltage and temperature variations were negligible at all points within the range of adjustment of the instrument.

It has been found that the values of inductance, capacitance and resistance present in the arms 45 and 47 may vary over a wide range so long as they are coordinated to provide a desired relay response. However, certain principles may be laid down for optimum performance. The impedances of the arms 45 and 47 may be represented by the following symbols:

$L_1$ is the inductance present in the arm 47
$C_1$ is the capacitance present in the arm 47
$f$ is the frequency at which the currents $I_1$ and $I_2$ are in phase
$R_1$ is the resistance present in the arm 47.

For optimum performance, it is desirable that the quantity $$\left(2\pi f L_1 - \frac{1}{2\pi f C_1}\right)$$

be small. The value of $L_1$ should be large and the value of $C_1$ should be small. This gives a large variation in phase angle for small variations in frequency. Furthermore, for optimum performance, the value of resistance should be selected in accordance with the following expression:

$$\sqrt{2}R_1 = \left(2\pi f L_1 - \frac{1}{2\pi f C_1}\right)$$

As previously pointed out, the errors introduced by variations in applied voltage are extremely small. However, if it is desired to render these errors still more negligible, a voltage bias winding may be provided for applying a compensating torque to the armature 9 which has a magnitude dependent on the magnitude of the applied voltage. The direction of the compensating torque depends on the nature of the correction required.

If the tripping frequency decreases as the applied voltage decreases for an underfrequency relay or if the tripping frequency increases as the applied voltage decreases in the case of an overfrequency relay, then the compensating torque applied to the armature 9 by the voltage bias winding should oppose the relay operating torque.

If the tripping frequency increases as the applied voltage decreases in an underfrequency relay or if the tripping frequency decreases as the applied voltage decreases in the case of an overfrequency relay, then the compensating torque applied to the armature 9 should aid the operating torque of the relay. By this expedient, the small voltage errors otherwise present may be substantially eliminated.

To illustrate a suitable structure for compensating for voltage errors, reference may be made to Fig. 4. In Fig. 4 a portion of the frequency relay of Fig. 1 is illustrated. However, the pole face of the pole piece 7 is shaded by a bias winding 65 which is adjustable across the face of the pole piece. This winding may be in the form of a single short circuited loop or plate of electroconductive material. Depending on its adjustment with respect to the pole face, the winding 65 applies a compensating torque to the armature 9 which aids or opposes the relay operating torque. Since the magnetic flux passing through the shading winding 65 depends on the current passing through the winding 21, and since such current varies as a function of the applied voltage, it follows that the winding 65 produces a compensating torque which is dependent on the magnitude of the applied voltage. Such shading windings are commonly employed for friction compensation in watthour meters and the construction and operation thereof are well known.

Effective compensation for voltage errors is provided by the arrangement shown in Fig. 5. The magnetic structure 1, windings 17, 19 and 21 and the connections illustrated in Fig. 1 also are employed in the arrangement of Fig. 5, except that for simplicity the switch 59 is omitted. In addition a winding 66 is employed which is energized through an adjustable resistor 68 and a reversing switch 70 from the terminals 49 and 51. The magnetic flux produced by the winding 66 is substantially proportional to the voltage applied to the terminals 49, 51. Depending on the position of the reversing switch 70 this magnetic flux coacts with the magnetic fluxes produced by the remaining windings to produce a compensating torque which aids or opposes the torque developed by the windings 17, 19 and 21 alone. By adjustment of the resistor 68, the magnitude of the compensating torque may be adjusted to compensate substantially for voltage changes.

Although the invention has been described with reference to certain specific embodiments thereof, numerous modifications thereof are possible and, therefore, the invention is to be restricted only by the appended claims as interpreted in view of the prior art.

I claim as my invention:

1. In an electrical relay device which is responsive to a predetermined variable characteristic of a variable quantity, means effective when energized by an alternating quantity for producing a pair of alternating electrical components having a phase relationship dependent on a predetermined variable characteristic of a quantity, said electrical components being in phase for a predetermined value of the quantity, and translating means responsive to the passage of said phase relationship between said alternating electrical components through said in-phase condition, whereby said translating means is responsive to the predetermined variable characteristic.

2. In an electrical relay device which is responsive to a predetermined variable characteristic of a variable quantity, a parallel circuit having two arms connected in parallel for energization from a common source of alternating energy, said arms having an impedance relationship responsive to a predetermined variable quantity for producing a phase relationship between the two currents flowing in said arms which varies as a function of said variable quantity, said electrical currents being in phase for a predetermined value of the variable quantity, means adjustable for varying the phase relationship between the two currents passing through said arms, and translating means responsive to passage of said phase relationship through said in-phase condition.

3. In an electrical relay device, a directional element comprising a first winding, a second winding and means directionally responsive to the direction of deviation of the phase relationship between alternating currents traversing said windings from an in-phase relationship, means connecting said windings in parallel for energization from a common source of alternating energy, means responsive to a predetermined variable quantity for varying the phase relationship between alternating currents traversing said windings through an in-phase condition, whereby said directional element is responsive to said variable quantity, and means for adjusting the time of response of said relay device to a deviation of said alternating currents from an in-phase relationship.

4. In an electrical relay device, a directional element comprising a first winding, a second winding and means directionally responsive to the direction of deviation of the phase relationship of one alternating current relative to another alternating current traversing said windings from an in-phase relationship, means connecting said windings respectively in two parallel arms of an electrical circuit for energization from a common source of alternating energy, said arms having impedances proportioned to produce in-phase currents when said arms are energized from a source of electrical energy alternating at a predetermined frequency, said impedances being responsive to deviation of the source from said predetermined frequency for producing a corresponding deviation of the phase relationship of said currents from said in-phase relationship, whereby said directional element is responsive to the direction of deviation of said source from said predetermined frequency.

5. In an electrical relay device, a directional element comprising a first winding, a second winding and means directionally responsive to the deviation of the phase relationship between alternating currents traversing said windings from a predetermined relationship, means connecting said windings respectively in two parallel arms of an electrical circuit for energization from a common source of alternating energy, said arms having impedances proportioned to produce in-phase currents when said arms are energized from a source of electrical energy alternating at a predetermined frequency, and means for adjusting the impedances of said arms to change the value of the frequency at which said currents are in phase, said impedances being responsive to deviation of the source from said predetermined frequency for producing a corresponding deviation of the phase relationship of said currents from said in-phase relationship, whereby said directional element is responsive to the direction of deviation of said source from said predetermined frequency.

6. In an electrical relay device responsive to the frequency of an alternating quantity, a directional element, an armature member, means mounting said armature member for rotation, a first winding, a second winding, said windings being effective when energized respectively by a first alternating current and by a second alternating current for producing a magnetic field acting to urge said armature member in a direction dependent on the direction of deviation of said first alternating current from an in-phase relationship relative to said second alternating current, and means connecting said first and second windings respectively in first and second parallel arms of an electrical circuit for energization from a common source of alternating voltage, said arms having impedances proportioned to establish a phase relationship between currents passing through said arms which varies as a function of the frequency of the alternating voltage applied to the electrical circuit over a range which includes said in-phase relationship, electrical contact means responsive to actuation of said armature member, whereby said contact means is controlled in accordance with the frequency of said alternating voltage, and time-delay-control means for adjusting the amount of rotation of said armature member required to operate said contact means.

7. In an electrical relay device responsive to the frequency of an alternating quantity, a directional element, an armature member, means mounting said armature member for rotation, a first winding, a second winding, said windings being effective when energized respectively by a first alternating current and by a second alternating current for producing a magnetic field acting to urge said armature member in a direction dependent on the direction of deviation of said first alternating current from an in-phase relationship relative to said second alternating current, and means connecting said first and second windings respectively in first and second parallel arms of an electrical circuit for energization from a common source of alternating voltage, said arms having impedances proportioned to establish a phase relationship between currents passing through said arms which varies as a function of the frequency of the alternating voltage applied to the electrical circuit over a range which includes said in-phase relationship, means for adjusting the impedances of said arms to change the frequency of the alternating voltage at which said predetermined phase relationship is established, and electrical contact means responsive to actuation of said armature member, whereby said contact means is controlled in accordance with the frequency of said alternating voltage, and time-delay-control means for adjusting the amount of rotation of said armature member required to operate said contact means.

8. In an electrical relay device which is responsive to a frequency, means effective when energized by an alternating voltage quantity for producing a pair of alternating electrical components having a phase relationship dependent on frequency, translating means responsive to the phase relationship between said alternating electrical components, whereby said translating means in responsive to frequency, said translating means being subject to error resulting to magnitude variations of said voltage quantity, and means responsive to variations in the voltage of said alternating voltage quantity for applying to said translating means an auxiliary energization proportioned to neutralize the effects of such voltage variations on the response of said translating means.

9. In an electrical relay device which is responsive to a predetermined variable characteristic of a variable quantity over a substantial range of temperature, a parallel circuit having two arms connected in parallel for energization from a common source of alternating energy, said arms having an impedance relationship substantially responsive to a predetermined variable quantity for producing a phase relationship between the two currents flowing in said arms which varies substantially as a function of said variable quantity, and translating means responsive to said phase relationship, whereby said translating means is substantially responsive to said variable quantity, the impedance of one of said arms having a substantial temperature coefficient proportioned to neutralize the effects of temperature variations on the response of said translating means to said variable quantity.

10. In an electrical relay device, a directional element comprising a first winding, a second winding and means responsive to the phase relationship between alternating currents traversing said windings, means connecting said windings in parallel for energization from a common source of alternating energy, means responsive to the frequency of an applied alternating voltage for varying the phase relationship between alternating currents traversing said windings, said directional element being responsive in some degree to variations in the magnitude of said alternating voltage, and means responsive to the magnitude of said alternating voltage for applying to the directional element an auxiliary energization proportioned to neutralize the effects of variations of the magnitude of said alternating voltage on the directional element, whereby said directional element is responsive to the frequency of an applied alternating voltage.

11. In an electrical relay device, a directional element comprising a first winding, a second winding and means directionally responsive to the deviation of the phase relationship between alternating currents traversing said windings from a predetermined relationship, means connecting said windings respectively in two parallel arms of an electrical circuit for energization from a common source of alternating energy, the impedances of said arms determining the phase relationship between alternating currents traversing said arms in response to the application of an alternating voltage applied across said electrical circuit, at least one of said impedances being reactive for varying the phase relationship between currents traversing said arms as a function of the frequency of the applied alternating voltage, said electrical device being responsive in some degree to the temperature of the portion of said electrical circuit other than said one of said impedances, said one of said impedances having a substantial temperature coefficient of impedance proportioned to compensate said electrical device for operation over a substantial temperature range, whereby said directional element is responsive to frequency of the applied alternating voltage over a substantial temperature range.

12. In an electrical relay device, a directional element comprising a first winding, a second winding and means directionally responsive to the deviation of the phase relationship between alternating currents traversing said windings from a predetermined relationship, means connecting said windings respectively in two parallel arms of an electrical circuit for energization from a common source of alternating energy, the impedances of said arms determining the phase relationship between alternating currents traversing said arms in response to the application of an alternating voltage applied across said electrical circuit, at least one of said impedances being reactive for varying the phase relationship between currents traversing said arms as a function of the frequency of the applied alternating voltage, said electrical device being responsive in some degree to changes in magnitude of the applied alternating voltage and to the temperature of the portion of said electrical circuit other than said one of said impedances, said one of said impedances having a substantial temperature coefficient of impedance proportioned to compensate said electrical device for operation over a substantial temperature range, and means responsive to the magnitude of the applied alternating voltage for applying to said directional element an auxiliary energization proportioned to neutralize the effects of variations of the magnitude of said alternating voltage on the electrical device, whereby said directional element is responsive to frequency of the applied alternating voltage over a substantial temperature range, and over a substantial range of voltage.

HERBERT J. CARLIN.